United States Patent

Stoney

(10) Patent No.: US 11,079,021 B2
(45) Date of Patent: Aug. 3, 2021

(54) BARRIER SYSTEM FOR MECHANICAL SEAL

(71) Applicant: AES Engineering Ltd., Mill Close (GB)

(72) Inventor: Andrew John Stoney, Kniveton (GB)

(*) Notice: Subject to any disclaimer, the term of this patent is extended or adjusted under 35 U.S.C. 154(b) by 202 days.

(21) Appl. No.: 14/301,671

(22) Filed: Jun. 11, 2014

(65) Prior Publication Data

US 2014/0367919 A1  Dec. 18, 2014

(30) Foreign Application Priority Data

Jun. 12, 2013 (GB) .................................. 1310427

(51) Int. Cl.
| | | |
|---|---|---|
| *F16J 15/16* | (2006.01) | |
| *F16J 15/40* | (2006.01) | |
| *F15B 1/08* | (2006.01) | |

(52) U.S. Cl.
CPC .............. *F16J 15/40* (2013.01); *F15B 1/08* (2013.01); *F16J 15/16* (2013.01); *F15B 2201/3152* (2013.01); *F15B 2201/4155* (2013.01); *F15B 2201/50* (2013.01); *F15B 2201/51* (2013.01)

(58) Field of Classification Search
CPC .................................. F16J 15/40; F16J 15/16
See application file for complete search history.

(56) References Cited

U.S. PATENT DOCUMENTS

| | | | | |
|---|---|---|---|---|
| 5,632,892 A | * | 5/1997 | Klein ..................... | B01D 61/08 210/108 |
| 5,769,427 A | * | 6/1998 | Ostrowski ............. | F04D 29/128 277/318 |
| 7,854,587 B2 | * | 12/2010 | Ito .......................... | F01D 11/04 415/168.2 |
| 9,400,055 B2 | * | 7/2016 | Broadbent ............... | F15B 1/02 |
| 2001/0017445 A1 | * | 8/2001 | Hall ........................ | F01D 11/06 277/457 |
| 2010/0326062 A1 | * | 12/2010 | Fong ..................... | H02J 15/006 60/325 |
| 2013/0164152 A1 | * | 6/2013 | Kjonigsen ............... | F04B 47/06 417/279 |
| 2014/0060030 A1 | * | 3/2014 | Ma ......................... | E02F 9/123 60/413 |
| 2014/0131049 A1 | * | 5/2014 | Bourgeau ............. | E21B 33/0355 166/363 |

\* cited by examiner

*Primary Examiner* — Kristina R Fulton
*Assistant Examiner* — Thomas L Neubauer
(74) *Attorney, Agent, or Firm* — Gary Baker; BioPatent Services

(57) ABSTRACT

A barrier system for a dual mechanical seal, the system comprising means for controlling barrier fluid pressure relative to product pressure. The pressure control means comprises means for monitoring the volume of barrier fluid in the system and for supplying additional fluid to the system to maintain the volume within a desired range. The system further comprises means for maintaining the barrier fluid pressure at a pre-determined pressure above product pressure.

17 Claims, 6 Drawing Sheets

BARRIER SYSTEM FOR MECHANICAL SEAL

RELATED APPLICATIONS

This application claims benefit and priority to UK patent application Barrier System for Mechanical Seal, GB 1310427.8, filed Jun. 12, 2013, which is incorporated in its entirety herein for all purposes.

FIELD OF INVENTION

This invention relates to mechanical seals and more specifically to barrier systems for dual mechanical seals.

BACKGROUND TO THE INVENTION

The operation of a dual mechanical seal typically requires a system to manage the fluid provided to the space between the pairs of mechanical seal faces. It is often desirable to provide a fluid that is pressurised so that the fluid between the pairs of mechanical seal faces is at a greater pressure than that of the product being sealed.

Such a system is commonly referred to as a barrier system. Since the pressure of the product is less than that of the system, fluid will always flow from the mechanical seal into the product hence creating a barrier to potentially hazardous product from contaminating the system fluid or the atmosphere.

An example of a barrier system is one incorporating a bladder accumulator that is used to both pressurise the barrier fluid and to hold a volume of barrier fluid for consumption by the mechanical seal. Such a system is commonly referred to as an API Plan 53B system.

A typical API Plan 53B system will be pre-charged with gas to a pre-determined pressure. Subsequently the system will be further charged by a volume of liquid which further raises the pressure in the system. Typically the volume of liquid is of the order of 10 to 20% of the available volume within the accumulator.

During normal operation, liquid in the system is consumed by the mechanical seal. This reduction in fluid volume results in a proportional reduction in the total system pressure. This pressure reduction is used to trigger an indication that the fluid in system requires replenishment.

The system described above has a number of limitations:
1. In order to maintain a positive pressure differential between barrier fluid and product, the system pressure must be set greater than the maximum possible product pressure. This means that the mechanical seal will be operating most of the time with a higher pressure differential than generally required. Operating the mechanical seal with an elevated pressure differential is detrimental to the seal and affects its reliability.
2. The fixed gas pre-charge results in pressure variation within the system when ambient temperatures vary. This pressure variation has the same detrimental effect as in 1 above. In addition the control system used to monitor the fluid level becomes more complex. Typically this requires the addition of temperature measurement and complex control algorithms to relate pressure and temperature variation to fluid consumption.
3. The volume of usable liquid in the system is limited by the acceptable pressure variations of the mechanical seal and those of the control system. Hence the system requires greater frequency of fluid replenishment then would otherwise be necessary.

STATEMENTS OF THE INVENTION

According to the present invention there is provided a barrier system for a dual mechanical seal, the system comprising means for controlling barrier fluid pressure relative to product pressure, said pressure control means comprising means for monitoring the volume of barrier fluid in the system and for supplying additional fluid to the system to maintain the volume within a desired range, and means for maintaining the barrier fluid pressure at a pre-determined pressure above product pressure.

Preferably the system includes a bladder accumulator.

Preferably the system includes means for supplying pressurised gas to said bladder accumulator and means for controlling the pressure of the gas supplied thereby to maintain the bladder fluid pressure at a pre-determined pressure above product pressure.

Preferably the control means includes a pressure tracking device located, in use, between a source of pressurised gas and the bladder accumulator.

Preferably the volume of barrier fluid in the system is monitored by a flow meter located, in use, between a source of barrier fluid and the bladder accumulator.

More preferably the volume of barrier fluid is additionally monitored by means for monitoring the consumption of fluid by the mechanical seal. Such additional monitoring means may comprise a flow meter for monitoring flow of barrier fluid to the seal and a flow meter for monitoring flow of barrier fluid from the seal.

The present invention further provides a method for maintaining barrier fluid pressure at pre-determined pressure above product pressure in a barrier system of a dual mechanical seal, the method comprising monitoring the volume of barrier fluid in system, supplying additional fluid to the system to maintain the volume within a desired range, monitoring the barrier fluid pressure and adjusting it where necessary to achieve said pre-determined pressure above said product pressure.

A system in accordance with the present invention will automatically adjust the system pressure relative to the changing product pressures such that the pressure differential (barrier to product) is always optimised for maximum mechanical seal reliability. The system will prevent ambient temperature variation affecting operating pressure differential. Furthermore the full fluid volume capability of the accumulator may be utilised.

BRIEF DESCRIPTION OF THE DRAWINGS

The accompanying drawings are as follows:
1.

DETAILED DESCRIPTION OF THE INVENTION

The present invention will now be described, by way of example only, with reference to the accompanying drawings.

Figure 1:
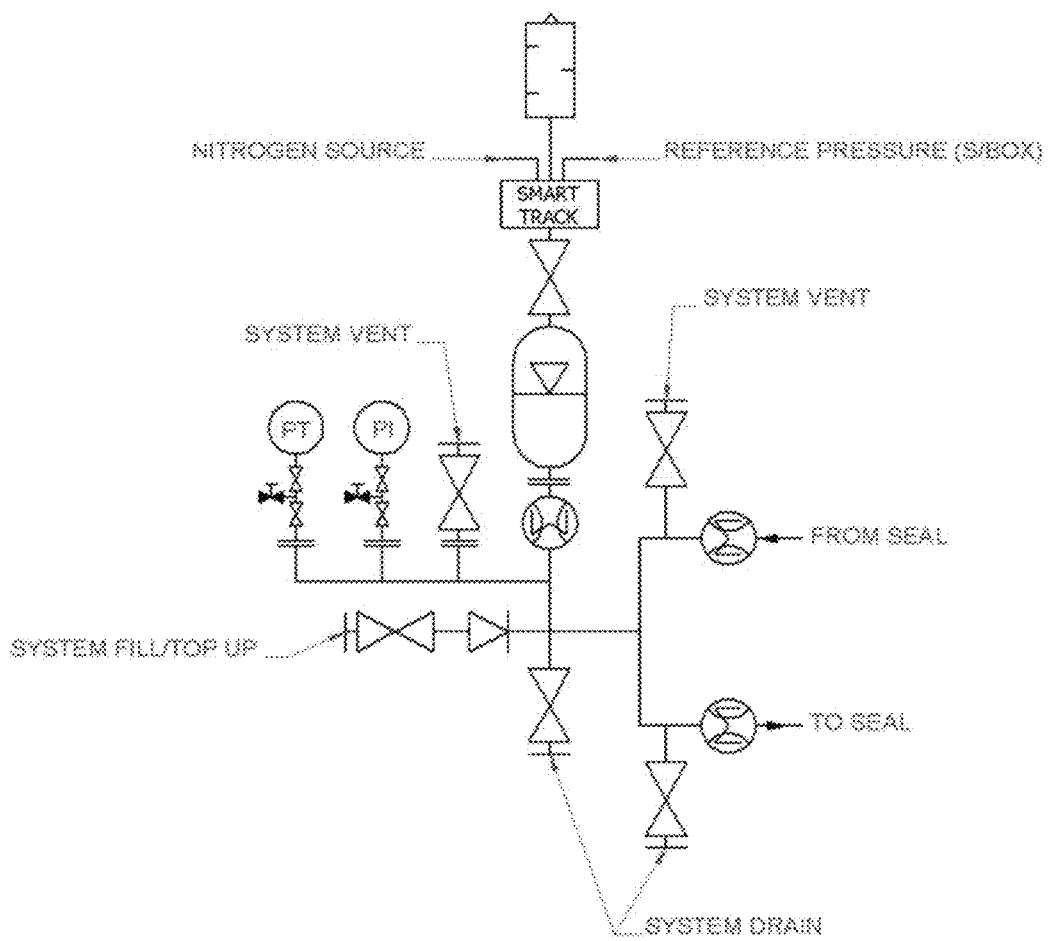
FIG. 1 illustrates diagrammatically the system for providing barrier fluid to a dual mechanical seal;
2.

Referring to FIG. 1 of the accompanying drawings, a system for supplying barrier fluid to a dual mechanical seal comprises a bladder accumulator 1 to which is connected a pressure tracking device 3, there being located between device 3 and accumulator 1 an adjustable valve 5. Pressure tracking device 3 is in turn connected to a source of pressurized nitrogen and to a location at which the pressure of barrier fluid in the system (the reference pressure) can suitably be determined. This position could be a vessel chamber of the seal.

Connected to the pressure tracking device 3 is a silencer 9. Also connected to bladder accumulator 1 is a flow meter 11 which measures liquid flow to and from the bladder accumulator. Barrier fluid flow through flow meter 11 can take place to the seal vessel chamber 16 via flow meters 13 and 15. Barrier fluid can be supplied to the system via feed 17 and system vents are provided at 19 and 21 and the system drains at 23 and 25. They can also be provided with one or both of pressure indicator 27 and electronic indicator 29 to control the system.

Figure 2:
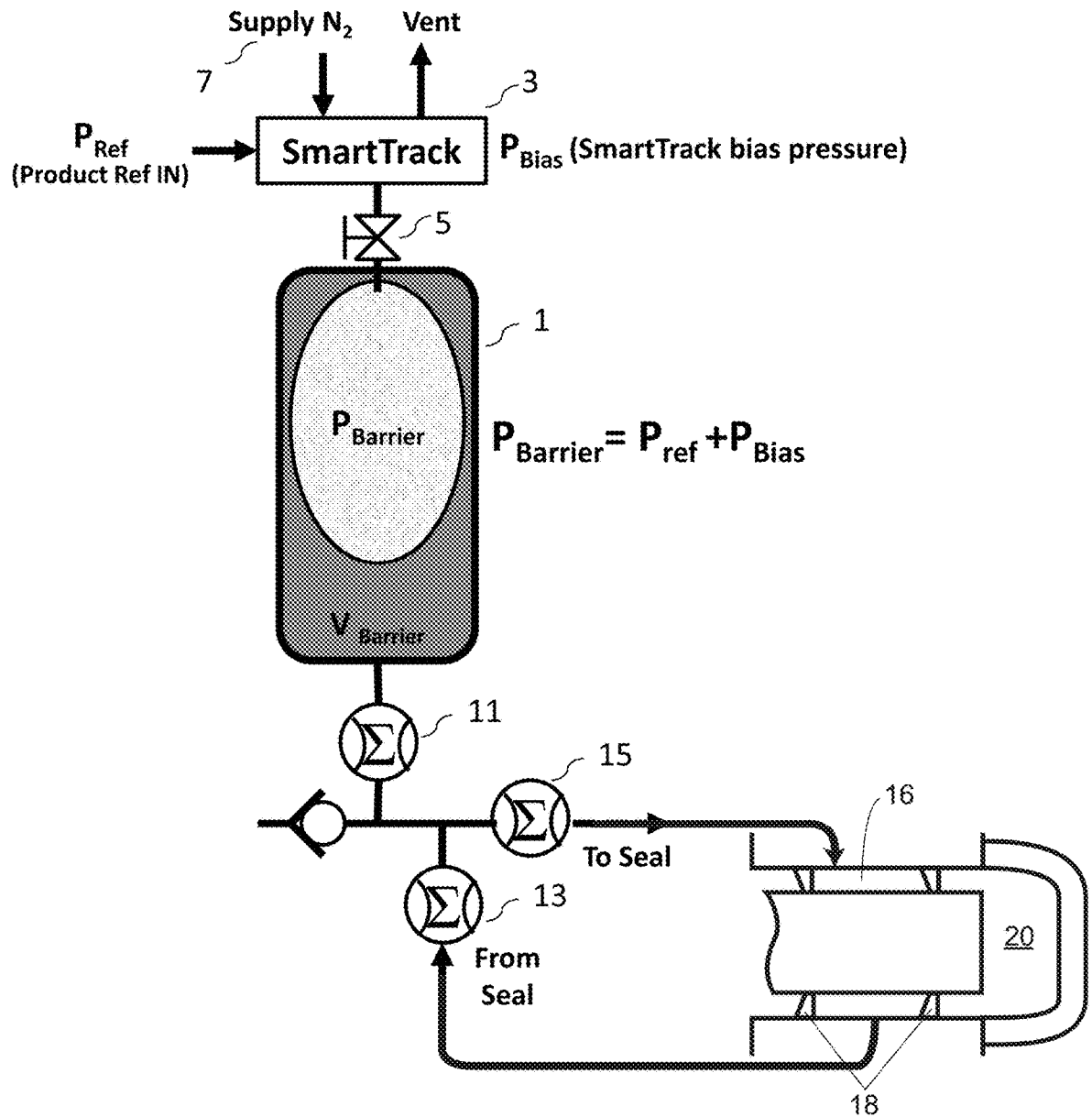
FIGS. 2 to 6 show various stages in the installation operation of a barrier system in accordance with the present invention.
Figure 3:
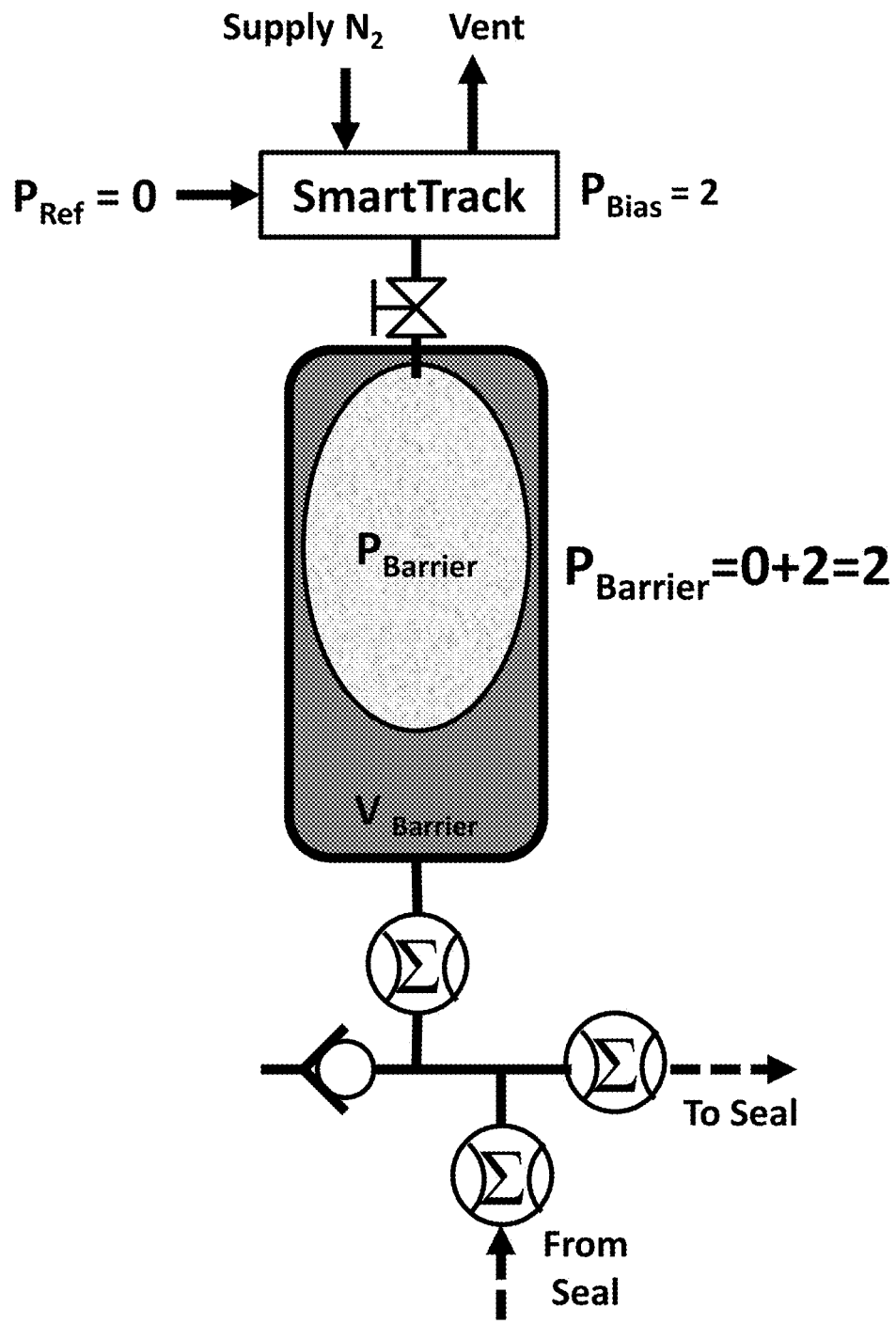

Referring to FIGS. 2 to 5 of the accompanying drawings, there is illustrated various stages in the operation of a system such as that shown in FIG. 1. The system is shown in simplified form with the bladder accumulator 1, pressure tracking device 3, valve 5 and flow meters 11, 13 and 15. As shown in FIG. 2, the system pressure ($P_{Barrier}$) is equal to the product pressure ($P_{Ref}$) and the bias pressure ($P_{Bias}$).

Referring to FIG. 2, there is illustrated the position when the system is initially commissioned. The supply gas is attached and the system pressure (PBarrier) "sets" itself. When set with all other inputs at zero pressure, the dual seal 18 loop is pressurised (PBarrier) and it equals biased pressure (PBias), the product 20 pressure (PRef) being at zero. In this case, (PRef) is assumed to be 2 barg (30 psig).

Once the pressure is set, the bladder accumulator gas pressure is locked so that the volume of gas remains constant. Barrier fluid can then be pumped in to the fluid circuit so that the volume of barrier fluid ($V_{Barrier}$) is as desired. Typically, the volume of barrier fluid does not exceed 80% of the available volume of the accumulator.

Once the barrier fluid volume is set, the bladder accumulator gas pressure is allowed to equalise back to the set bias pressure (pressure having being increased due to the reduced gas volume).

The system "tracks" input pressure ($P_{Ref}$) maintaining a positive pressure differential such that the barrier pressure ($P_{Barrier}$) equals the reference pressure ($P_{Ref}$) plus the bias pressure ($P_{Bias}$).

The system will continue to operate in this manner as the volume of barrier fluid is consumed by the mechanical seal being serviced by the system.

Figure 4:
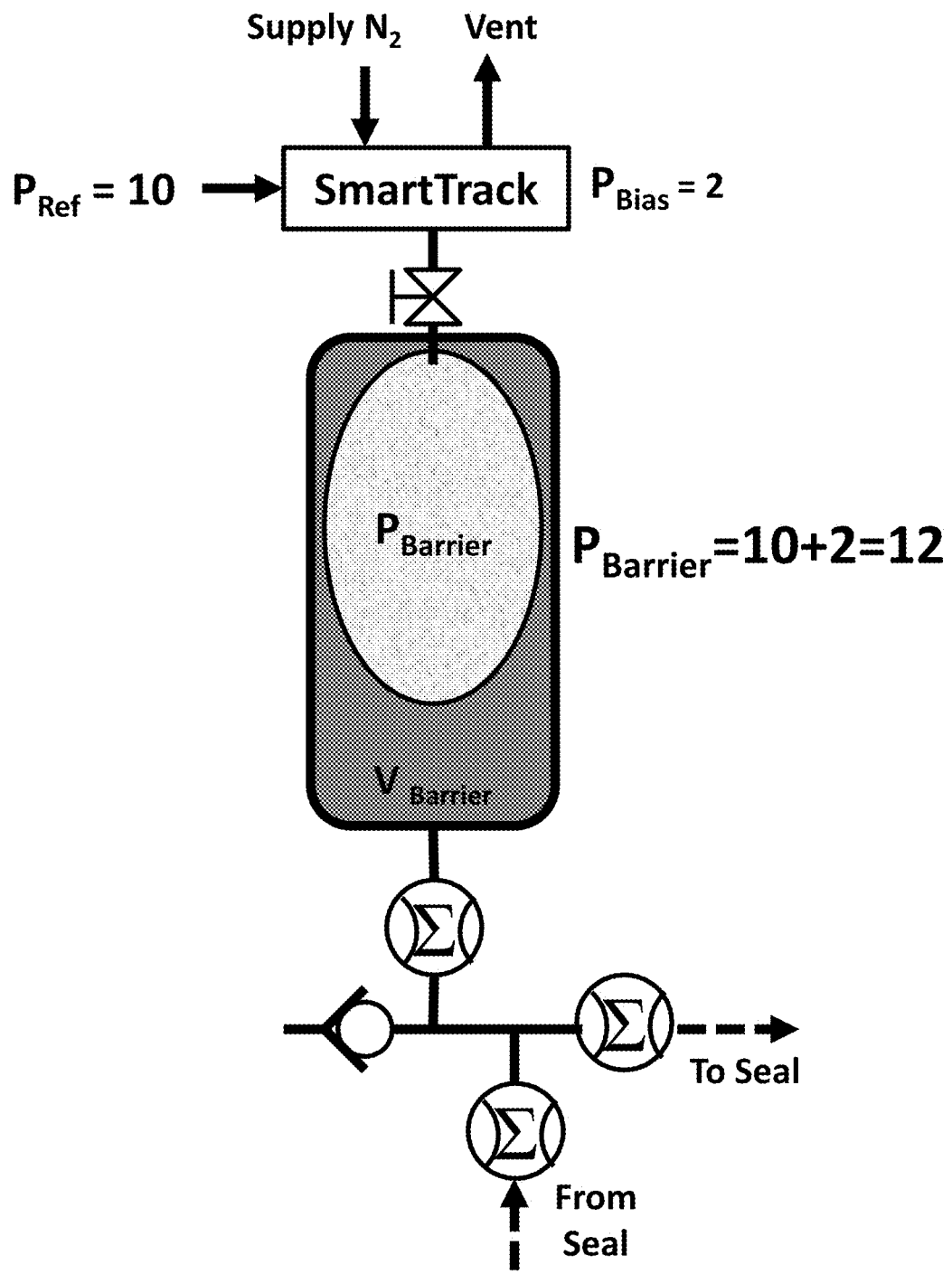

FIG. 4 shows the position when there is a "normal" amount of fluid in the system, the product pressure ($P_{Ref}$) is 10 barg and the ($P_{Barrier}$) pressure is 12 barg.

Figure 5:
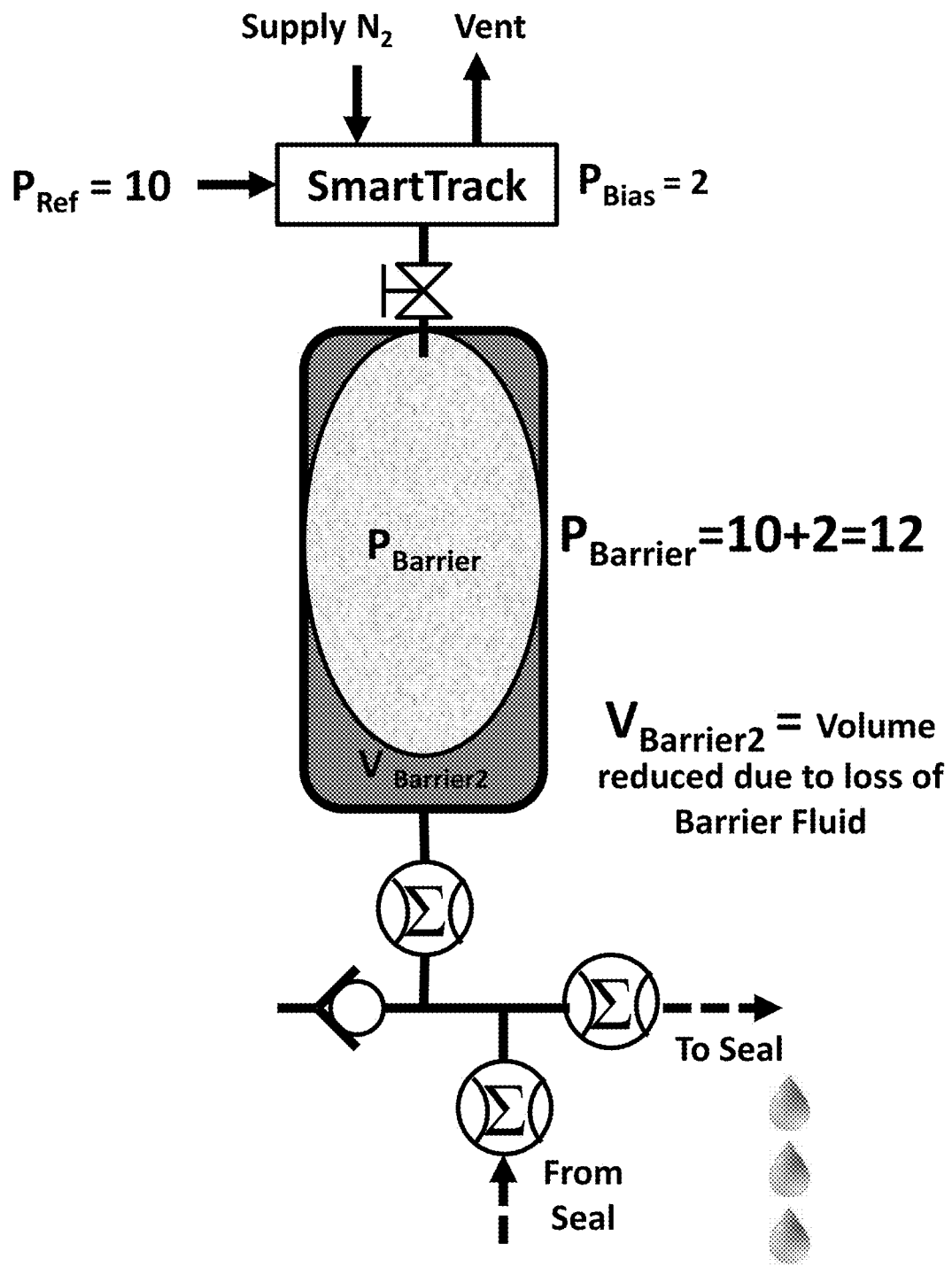

In FIG. 5 the amount of barrier fluid has reduced ($V_{Barrier2}$) due to the loss of barrier fluid from the seal. During this process ($P_{Barrier}$) is maintained at 12 barg.

Figure 6:
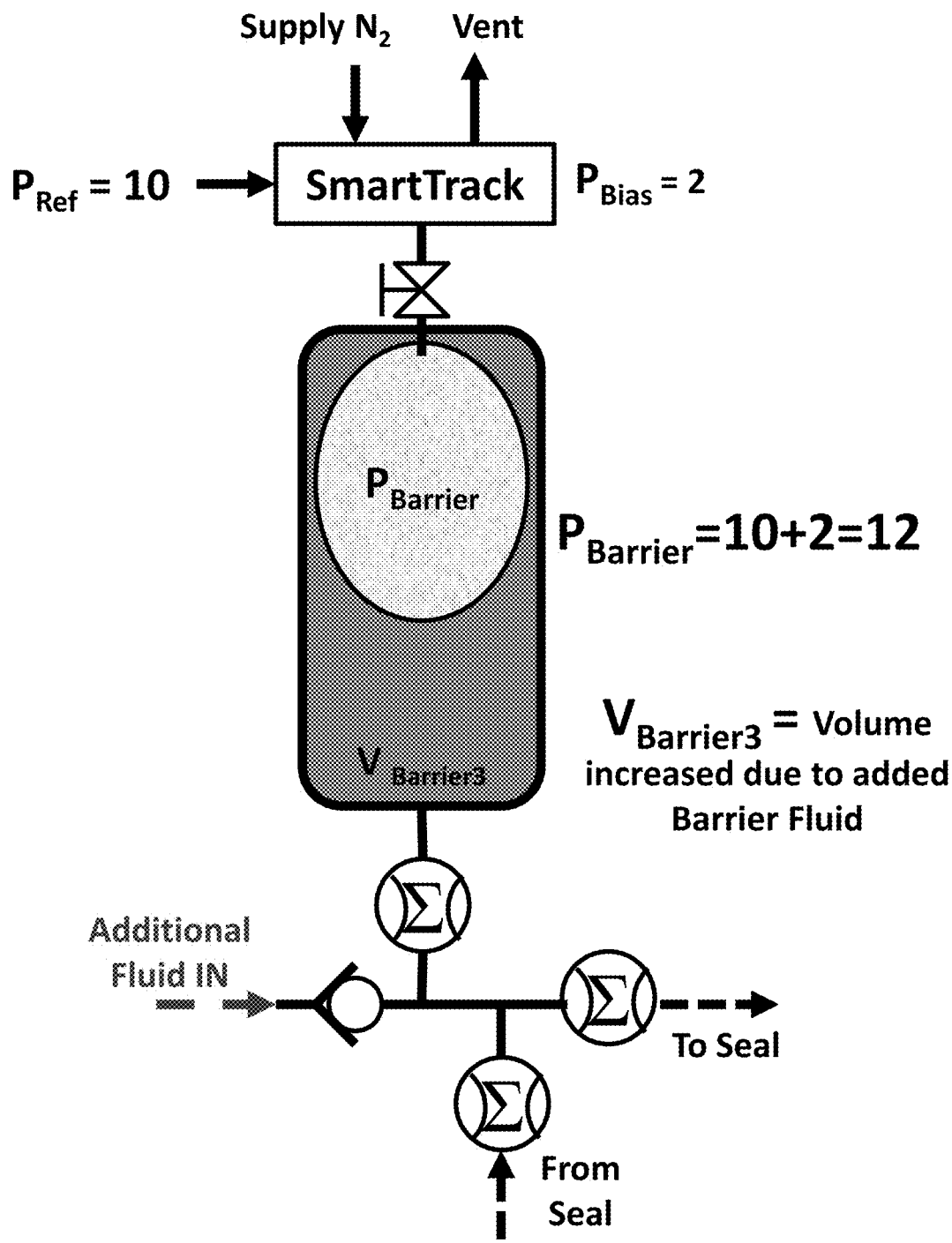

FIG. 6 shows the position after the additional fluid has been supplied to the bladder accumulator. During this process the SmartTrack pressure tracking device continues to regulate the pressure in the system by allowing excess gas to vent to atmosphere as the volume of liquid increases.

In order for the system to be effectively controlled, the volume in the system ($V_{Barrier}$) needs to be known and monitored. This is achieved by the use of three flow meters that log flow of liquid into the system and consumption of fluid by the mechanical seal. In other embodiments of the present invention this monitoring of the volume of liquid can achieved by other means.

The invention claimed is:

1. A barrier system comprising:
   a dual mechanical seal comprising a pair of seals with a barrier seal chamber between the pair of seals, wherein the barrier seal chamber has a barrier seal pressure ($P_{barrier}$); and,
   a controller comprising a product pressure reference ($P_{ref}$) input, a valve output controlling flow of a barrier fluid into the barrier seal chamber, and pre-determined pressure ($P_{bias}$) setting above the product pressure reference ($P_{ref}$);
   wherein the controller is configured to track the $P_{barrier}$ and control the barrier fluid flow to maintain the $P_{bias}$ in the barrier seal chamber over the product pressure;
   wherein the controller further comprises a volume monitor adapted to monitor a volume ($V_{barrier}$) of barrier fluid in the system; and,
   wherein the volume monitor comprises one or more flow meters selected from the group consisting of: a flow meter between a bladder accumulator and the barrier seal chamber; a flow meter receiving fluid flowing from the barrier seal chamber; a pair of flow meters with one of the pair upstream to the barrier seal chamber and one of the pair downstream from the barrier seal chamber; and three flow meters.

2. The barrier system of claim 1, wherein the pair of seals are spaced along a shaft.

3. The barrier system of claim 1, wherein a product having the product pressure is in contact with one of the pair of seals on a side opposite the barrier seal chamber.

4. The barrier system of claim 3, wherein the product having the product pressure is in direct contact with at least one of the seals.

5. The barrier system of claim 1, wherein the controller is adapted to provide the pressure in the barrier seal chamber of $P_{bias}$ over the product pressure when the product pressure reference ($P_{ref}$) input is zero.

6. The barrier system of claim 5, wherein the controller is adapted to control flow of the pressurized gas through a valve to a barrier fluid accumulator which provides barrier fluid to the barrier seal chamber.

7. The barrier system of claim 6, wherein the flow of the pressurized gas through the valve controls the $P_{barrier}$ of the barrier seal chamber.

8. The barrier system of claim 7, further comprising a bladder accumulator adapted to receive the pressurized gas and provide the barrier seal chamber with a barrier fluid at $P_{barrier}$.

9. The barrier system of claim 1, wherein the volume monitor is adapted to monitor a volume of barrier fluid consumed by leakage through the seals.

10. The barrier system of claim 1, wherein the system is configured to monitor the barrier seal chamber pressure and increase the barrier seal pressure when the $P_{barrier}$ is less than the $P_{ref}$ plus the $P_{bias}$.

11. The barrier system of claim 1, wherein the controller is adapted to maintain the $P_{barrier}$ at a $P_{bias}$ above the $P_{ref}$, and adapted to monitor the ($V_{barrier}$) in the system and supply additional fluid to the system to maintain the ($V_{barrier}$) within a desired range.

12. The barrier system of claim 11, wherein the controller is adapted to receive pressure readings from the product and from the barrier fluid; and wherein the controller releases pressure from the barrier system when the $P_{barrier}$ is above $P_{ref}$ plus $P_{bias}$.

13. The barrier system of claim 1, wherein the system is adapted to maintain $P_{barrier}$ at $P_{ref}$ plus $P_{bias}$.

14. The barrier system of claim 1, wherein the barrier fluid is a liquid.

15. The barrier system of claim 1, wherein the volume monitor comprises a flow meter measuring a loss of fluid through the barrier seal chamber.

16. The barrier system of claim 1, wherein the product pressure reference ($P_{ref}$) input comprises a tracked product pressure.

17. The barrier system of claim 1, wherein the predetermined pressure ($P_{bias}$) setting above the product pressure has a value greater than zero.

* * * * *